United States Patent [19]

Benes

[11] Patent Number: 5,719,772
[45] Date of Patent: Feb. 17, 1998

[54] PROCESS AND DEVICE FOR MINIMIZING IN AN INERTIAL MEASUREMENT SYSTEM THE ERROR DUE TO A PERTURBING MOTION IN THE RETRIEVAL OF THE VELOCITY

[75] Inventor: Christian Benes, Saint Germain En Laye, France

[73] Assignee: Aerospatiale Societe Nationale Industrielle, Paris, France

[21] Appl. No.: 526,982

[22] Filed: Sep. 12, 1995

[30] Foreign Application Priority Data

Sep. 28, 1994 [FR] France .................. 94 11573

[51] Int. Cl.$^6$ .................. G01C 21/00; G01P 15/00
[52] U.S. Cl. .................. 364/453
[58] Field of Search .................. 364/453, 559, 364/571.01, 572

[56] References Cited

U.S. PATENT DOCUMENTS

| | | | |
|---|---|---|---|
| 4,601,206 | 7/1986 | Watson | 73/514 |
| 4,675,820 | 6/1987 | Smith et al. | 364/453 |
| 4,812,977 | 3/1989 | Hulsing, II | 364/422 |
| 5,001,647 | 3/1991 | Rapiejko et al. | 364/453 |
| 5,422,817 | 6/1995 | Tazartes et al. | 364/571.01 |

OTHER PUBLICATIONS

Dr. Bernard Schwartz; *Strapdown System Errors With Dynamic Inputs*; IEEE; Position Location And Navigation Symposium; Atlantic City, NJ; Dec. 1982; pp. 260–274.
Paul G. Savage; *Strapdown System Algorithms*; Advances In Strapdown Inertial Systems; 1984.
Miller, "A New Strapdown Attitude Algorithm", Journal of Guidance, vol. 6, No. 4, Jul. 1, 1983, pp. 287–291.

*Primary Examiner*—Michael Zanelli
*Attorney, Agent, or Firm*—Watson Cole Stevens Davis, P.L.L.C.

[57] ABSTRACT

A process and a device are provided in a strapdown inertial measurement system for minimizing the error due to any perturbing motion in the retrieval of the velocity. The device is connected to an assembly of accelerometers and to an assembly of gyrometers and it includes a first peripheral computer for carrying out vector multiplications, a second peripheral computer for carrying out vector products, and a central computer connected to the first and second peripheral computers and coordinating the various calculations.

9 Claims, 2 Drawing Sheets

PROCESS AND DEVICE FOR MINIMIZING IN AN INERTIAL MEASUREMENT SYSTEM THE ERROR DUE TO A PERTURBING MOTION IN THE RETRIEVAL OF THE VELOCITY

The present invention relates to a process for minimizing, in a strapdown inertial measurement system, the error due to any perturbing motion in the retrieval of the velocity, as well as to a device for the implementation of this retrieval of the velocity with minimized error.

During the operation of such a so-called strapdown inertial measurement system, the accelerometric measurements relating to said System which can move with respect to an inertial trihedron are carried out in an accelerometric trihedron which is defined with respect to said system, which is subjected to the motions of the latter and which is therefore moving with respect to said inertial trihedron, and these accelerometric measurements have subsequently to be transformed so as to be known in said inertial trihedron.

To carry out this transformation, the attitude between said moving trihedron and said fixed trihedron is determined, from measured gyrometric data indicating the angular variations per unit time between the two relevant trihedra.

Generally, this attitude is determined through known algorithms, one of the most used and best suited to this type of calculation being the so-called Miller algorithm, and it is embodied in the form of a computational means, for example in the form of a transformation matrix or of a transformation quaternion.

It will be noted that said Miller algorithm is in particular set out in the article "A new strapdown attitude algorithm" by Robin Miller, "Journal of Guidance", volume 6, No. 4, 1983.

By then combining the accelerometric data, that is to say generally velocity variations per unit time, measured in said moving trihedron with said computational means, measurements defined in the inertial trihedron are obtained.

However, these measurements are only exact if the motion between the moving trihedron and the fixed trihedron is invariable. As soon as this motion varies, that is to say as soon as the moving body is subjected to a perturbing additional motion, in addition to the prescribed motion, errors appear in the retrieval of the velocity.

These errors and the perturbing motions from which they stem are well known. Thus, for example, the document FR-2 552 222 presents two different perturbing motions, namely a conical motion which is caused by motions of the input axes of gyroscopes used in the system and giving rise to errors in the measurement of the angular accelerations, and a sculling motion, according to which linear and angular vibrations at a relatively high frequency of a few hundred Hertz along two orthogonal axes produce a uniform linear acceleration along the third orthogonal axis.

The latter motion is the most frequent perturbing motion and the most disturbing one in the type of system considered. The document U.S. Pat. No. 4,675,820, for example, also mentions the existence of this sculling motion.

Also, to compensate for the errors due to such perturbing motions, corrections have to be made to the measured accelerometric data in order to obtain in said fixed trihedron, after transforming said data, velocity measurements which are close to the actual values.

For a sculling motion, for example, a correction of $½\Delta\vec{\theta}\wedge\Delta\vec{V}$ is generally made to the measured value of the velocity increment $\Delta\vec{V}$, $\Delta\vec{\theta}$ corresponding to the angular variations per unit time between the moving trihedron and the fixed trihedron, and measured simultaneously with $\Delta\vec{V}$, so as to obtain a velocity increment $\Delta\vec{V}'$ intended to be transformed and which is defined by the relation:

$$\Delta\vec{V}'=\Delta\vec{V}-½\Delta\vec{\theta}\wedge\Delta\vec{V}$$

The document U.S. Pat. No. 4,812,977 indicates for example this correction formula for a sculling motion.

However, this usual solution is scarcely satisfactory since, on the one hand, it does not allow an optimal correction to be made since a non-negligible error remains after the correction and, on the other hand, it requires relatively substantial computations for its implementation.

The object of the present invention is to remedy these drawbacks. It relates to a process for minimizing, in a strapdown inertial measurement system, the error due to any perturbing motion in the retrieval of the velocity, said velocity being retrieved by implementing an appropriate velocity retrieval process using for this purpose measured accelerometric and gyrometric data combined with specific coefficients.

To this end, according to the invention, said process is noteworthy in that:

- an error criterion is defined, highlighting the error due to the presence of said perturbing motion in the retrieval of the velocity and determined from said specific coefficients;
- the values of said specific coefficients which enable said error criterion to be minimized are calculated; and
- said calculated values of the coefficients are integrated into said velocity retrieval process.

Thus, by virtue of the invention, it is feasible to enhance said velocity retrieval process in such a way as to minimize the error in the retrieval of the velocity, and to do so irrespective of the relevant perturbing motion.

Moreover, the correction thus defined makes it possible to obtain a particularly accurate result and it can be implemented with low computational cost.

Advantageously, in order to determine the velocity VF in a fixed inertial trihedron of the system, the implementation of the velocity retrieval process utilizes a velocity increment $\Delta\vec{VF}$ exhibiting a general theoretical form defined by the relation $\Delta\vec{VF}=B(t)\Delta\vec{V}eq$, in which $\Delta\vec{V}eq$ represents a velocity increment formed from said accelerometric data measured in an accelerometric trihedron moving in said system, from said gyrometric data and from said specific coefficients, and B(t) is an attitude matrix depending on the time t and making it possible to transfer from the accelerometric trihedron to the inertial trihedron.

Moreover, preferably, the general theoretical form of $\Delta\vec{VF}$ is defined by the relation:

$$\Delta\vec{VF} = B(t)\left[\sum_{n=1}^{n=p}\Delta\vec{Vn} + \left(\sum_{n=1}^{n=p}an\Delta\vec{\Theta}n\right)\wedge\left(\sum_{n=1}^{n=p}bn\Delta\vec{Vn}\right)\right]$$

in which n=1, 2, ..., p, and p is an integer greater than or equal to 2, $\Delta\vec{V}1$ to $\Delta\vec{V}p$ represent successive accelerometric measurements, $\Delta\vec{\theta}1$ to $\Delta\vec{\theta}p$ represent successive gyrometric measurements, and a1 to ap as well as b1 to bp represent coefficients to be determined.

Furthermore, as error criterion, the mean value of the velocity $\Delta\vec{V}mea$ obtained from the velocity increment $\Delta\vec{VF}$ is calculated. For example, when the perturbing motion is a periodic motion with angular frequency $\Omega$, said mean value of the velocity $\Delta\vec{V}mea$ is calculated over one period $2\pi/\Omega$ of said perturbing motion, by the relation:

$$\Delta\vec{V}mea = \Omega/2\pi \int_0^{2\pi/\Omega} \Delta\vec{V}F dt$$

Furthermore, according to the invention, to determine the coefficients a1 to ap and b1 to bp appearing in the general theoretical form of $\Delta\vec{V}F$ cited earlier:

a truncated expansion of said mean value of the velocity $\Delta\vec{V}mea$ is carried out; and the coefficients a1 to ap and b1 to bp which make it possible to zero at least the first order in said truncated expansion are calculated.

As mentioned earlier, the most frequent and most disturbing perturbing motion in such a strapdown inertial measurement system is a sculling motion consisting of a conical motion and a sinusoidal acceleration along the axis of the conical motion.

In order to correct the errors due to such a sculling motion in the retrieval of the velocity, the present invention provides in particular for two particularly advantageous preferred solutions.

In a first solution, a general theoretical form of $\Delta\vec{V}F$ such as defined earlier is used for which p=2, making it possible to obtain a velocity increment defined by the relation:

$$\Delta\vec{V}F = B(t)[\Delta\vec{V}j + (ai\Delta\vec{\theta}i + aj\Delta\vec{\theta}j)\Lambda(bi\Delta\vec{V}i + bj\Delta\vec{V}j)]$$

in which, for any value of ai, the coefficients aj, bi and bj satisfy:

$$\begin{cases} aj = 1ai \\ bi = -1/(12\, 1ai) \\ bj = 1/(12\, ai) \end{cases}$$

with 1 a solution of the equation $1^2 + 6l - 1 = 0$, $\Delta\vec{V}i$ and $\Delta\vec{V}j$ being two successive accelerometric measurements and $\Delta\vec{\theta}i$ and $\Delta\vec{\theta}j$ being two successive gyrometric measurements. This solution has the advantage of requiring for its implementation only a minimum of successive measurements, namely two accelerometric measurements and two gyrometric measurements, and moreover the accuracy obtained, in the correction of the error due to the perturbing sculling motion, is satisfactory.

So as to increase this accuracy still further, a second solution is provided for according to the invention.

In this second solution, a general theoretical form of $\Delta\vec{V}F$ as defined previously is advantageously used for which p=3, making it possible to obtain a velocity increment defined by the relation:

$$\Delta\vec{V}F = B(t)[\Delta\vec{V}1 + \Delta\vec{V}2 + \Delta\vec{V}3 + (a1\Delta\vec{\theta}1 + a2\Delta\vec{\theta}2 + a3\Delta\vec{\theta}3)\Lambda(b1\Delta\vec{V}1 + b2\Delta\vec{V}2 + b3\Delta\vec{V}3)]$$

in which, for any value of a3, the coefficients a1, a2, b1, b2 and b3 satisfy:

$$\begin{cases} a1 = ka3 & b1 = -\frac{19}{20} \cdot \frac{1}{a3} \\ a2 = \frac{k(47k+7)}{19k^2-1} a3 & b2 = \frac{1}{20} \cdot \frac{133k+47}{(19k^2-1)} \cdot \frac{1}{a3} \\ & b3 = -\frac{1}{20k} \cdot \frac{1}{a3} \end{cases}$$

with k a solution of the equation:

$$6859k^6 - 10830k^5 - 6612k^4 - 2000k^3 - 348k^2 - 30k + 1 = 0.$$

In addition to allowing a particularly accurate correction to the error existing in the retrieval of the velocity, this second solution has the advantage of being particularly well suited to joint use with the Miller algorithm cited in the preamble and generally used to carry out the calculations for transforming between the moving trihedron and the fixed trihedron.

The present invention also relates to a device for minimizing in a strapdown inertial measurement system the error due to any perturbing motion in the retrieval of the velocity, said device making possible the implementation of the retrieval of the velocity with minimized error obtained by the process in accordance with the invention and described earlier.

According to the invention, said device is noteworthy in that it is connected to an assembly of accelerometers making it possible to measure said accelerometric data and to an assembly of gyrometers making it possible to measure said gyrometric data and wherein it includes:

a first peripheral computer capable of carrying out vector multiplications;

a second peripheral computer capable of carrying out vector products; and a central computer connected to said first and second peripheral computers and coordinating the various calculations.

The figures of the appended drawing will elucidate the mariner in which the invention may be embodied. In these figures, identical references denote similar elements.

The present invention is implemented in a strapdown inertial measurement system, not represented, in which it is sought to ascertain the velocity of said system which is moving with respect to a fixed inertial trihedron Tf.

It is sought to ascertain said velocity from accelerometric measurements made in an accelerometric trihedron Tm strapped to said system and therefore moving with respect to said inertial trihedron Tf.

Figure 1:
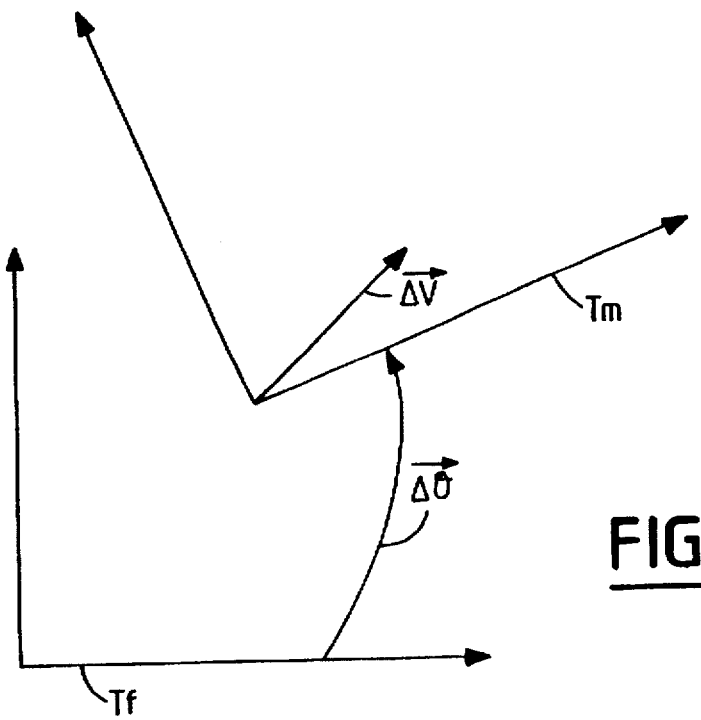
FIG. 1 illustrates diagrammatically the relation between an accelerometric trihedron and an inertial trihedron in a strapdown inertial measurement system.

So as to ascertain the velocity of said system with respect to said inertial trihedron, it is necessary to ascertain said accelerometric measurements in said inertial trihedron Tf. This is achieved by transforming the measurements made in said moving trihedron Tm to said fixed trihedron Tf, said trihedra being represented diagrammatically in FIG. 1.

Figure 2:
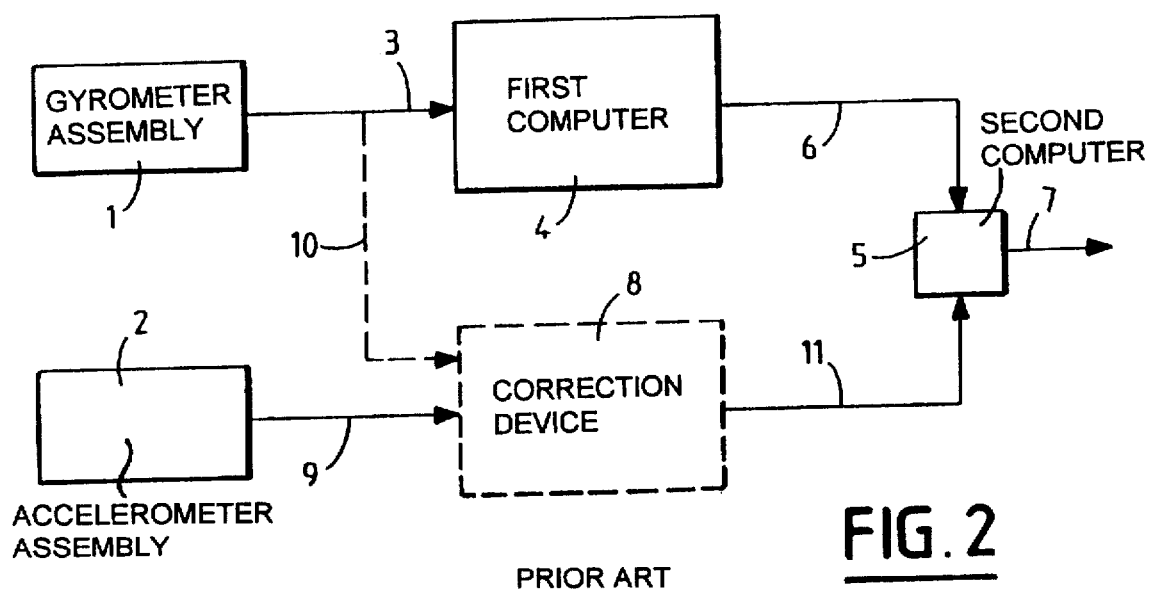
FIG. 2 shows diagrammatically the usual mode of computing the velocity in a strapdown inertial measurement system.

FIG. 2 illustrates diagrammatically the usual mode of determining the velocity in a strapdown inertial measurement system, implementing a known process of velocity retrieval.

For this purpose, said system includes:
on the one hand, an assembly 1 of gyrometers capable of making measurements of gyrometric data $\Delta \vec{\theta}$ corresponding to angular variations per unit time, due to the motion of the moving trihedron Tm with respect to the fixed trihedron Tf; and
on the other hand, an assembly 2 of accelerometers capable of making measurements of accelerometric data, for example in the form of velocity increments $\Delta \vec{V}$ corresponding to velocity variations per unit time, measured in said moving trihedron Tm and relating to said moving body.

Said gyrometric measurements $\Delta \vec{\theta}$ are transmitted by way of a link 3 to a first computer 4 capable of determining a computational means, for example a quaternion or a matrix B(t), retrieving the attitude of the system and making it possible to transfer from the moving reference Tm to the fixed reference Tf.

For this purpose, in order to determine said computational means, said first computer 4 implements a known specific algorithm, preferably the Miller algorithm cited earlier.

If, in such a situation, said computational means transmitted by a link 6 and said measured accelerometric data $\Delta \vec{V}$ are combined in a second computer 5, then the accelerometric data defined in the fixed reference Tf and capable of being transmitted by said second computer 5 by way of a link 7 are obtained at the output of said second computer 5.

However, by reason of the existence of perturbing motions, for example a sculling motion, such as described below, retrieval of said accelerometric data, and in particular of the velocity resulting therefrom, is erroneous.

Also, it is necessary to make a correction to said accelerometric data before transmitting them to said second computer 5. This is done, in a known manner, by way of a known correction device 8 represented dashed in FIG. 2 and connected, respectively by way of links 9 and 10, to said assembly 2 of accelerometers and to said assembly 1 of gyrometers, said correction device 8 transmitting the results of the correction made to said second computational means 5 by way of a link 11.

The computational methods currently known and implemented by said known correction device 8 formed appropriately are somewhat inaccurate and require further substantial computations.

It will be noted, by way of example, that, for a sculling motion consisting of a conical motion combined with a sinusoidal acceleration, a correction of $\frac{1}{2}\Delta\vec{\theta}\Lambda\Delta\vec{V}$ is generally made to the measured value of the velocity increment $\Delta \vec{V}$, $\Delta\vec{\theta}$ being measured simultaneously with $\Delta\vec{V}$, in such a way as to obtain, at the output of the correction device 8, a velocity increment $\Delta\vec{V}'$ intended to be transformed and defined by the relation: $\Delta\vec{V}'=\Delta\vec{V}-\frac{1}{2}\Delta\vec{\theta}\Lambda\Delta\vec{V}$.

However, like the other known types of correction, the correction thus defined is scarcely satisfactory as regards the accuracy of the results obtained.

Figure 3:
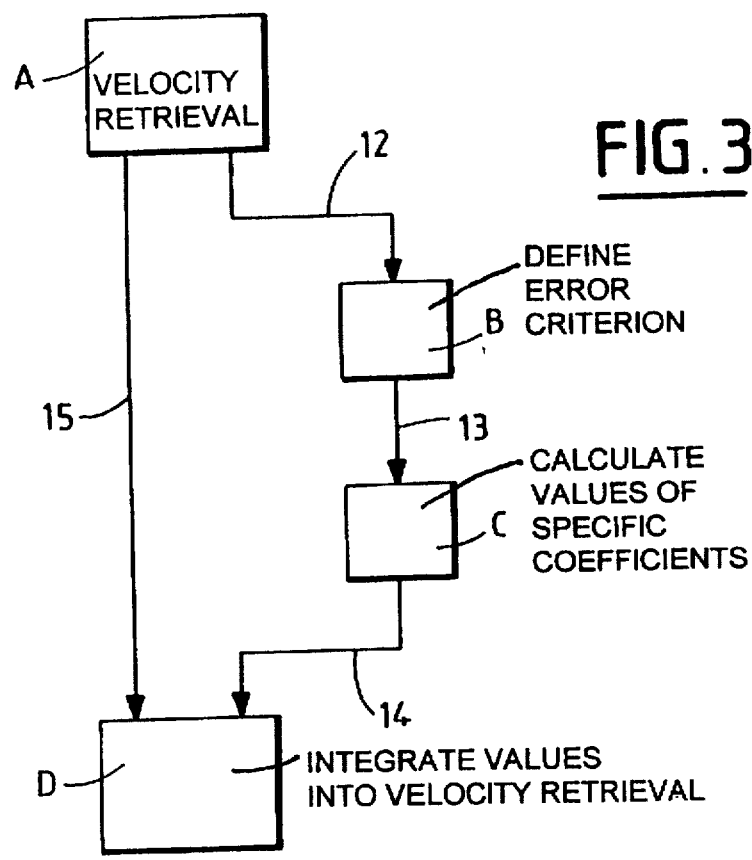
FIG. 3 illustrates diagrammatically the various steps of the process in accordance with the invention.
Figure 4:
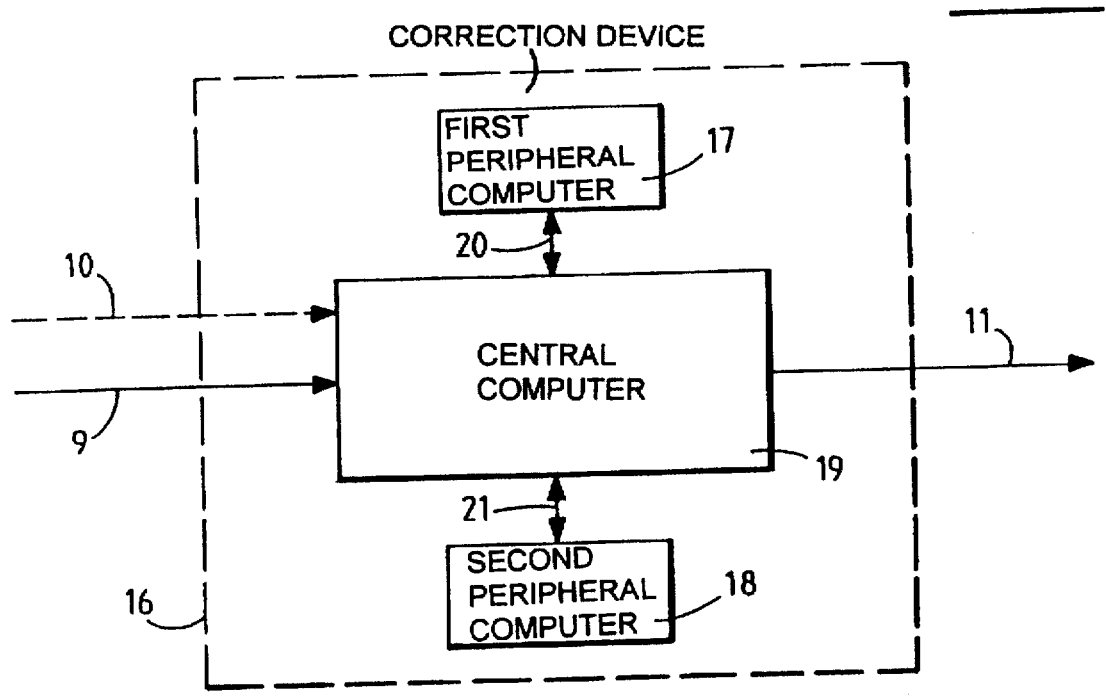
FIG. 4 is the schematic diagram of a device in accordance with the invention.

In order to remedy these drawbacks, the present invention proposes a process whose steps are illustrated diagrammatically in FIG. 3, making it possible to enhance a velocity retrieval process in such a way as to obtain a particularly effective correction, as well as a correction device 16 represented in FIG. 4, intended to replace the correction device 8 of FIG. 2 and allowing implementation of the results obtained on the basis of the process in accordance with the invention.

To obtain an enhanced process of velocity retrieval allowing extremely accurate correction of the error due to any perturbing motion in retrieval of the velocity, said velocity retrieval process defined in a preliminary step A making it possible to calculate said velocity from said accelerometric and gyrometric data capable of being measured and combined with specific coefficients, the following steps are performed according to the invention:

in a first step B, an error criterion is defined, highlighting the error due to the presence of said perturbing motion in the retrieval of the velocity and determined from said specific coefficients used in the velocity retrieval process defined in the preliminary step A and transmitted via a link 12;

in a second step C, the values of said specific coefficients which enable said error criterion defined in the first step B and transmitted via a link 13 to be minimized are calculated; and in a third and final step D, the values calculated in the second step C and transmitted via a link 14 are integrated into said velocity retrieval process defined in the preliminary step A and transmitted via a link 15.

Furthermore, according to the invention, in order to determine the velocity VF in the fixed inertial trihedron Tf of the system, the implementation of the velocity retrieval process utilizes a velocity increment $\Delta\vec{VF}$ exhibiting a general theoretical form defined by the relation $\Delta\vec{VF}=B(t)\Delta\vec{V}eq$, in which $\Delta\vec{V}eq$ represents a velocity increment formed, as clarified below, from the accelerometric data measured in the moving accelerometric trihedron Tm, from the gyrometric data and from the specific coefficients, and B(t) is an attitude matrix depending on the time t and making it possible to transfer from the accelerometric trihedron Tm to the inertial trihedron Tf.

Said matrix B(t) is calculated in said first computer 4, as mentioned earlier, and said velocity increment $\Delta\vec{V}eq$ is formed in the correction device 16.

To obtain the appropriate correction to a determined perturbing motion, it is thus required to determine said velocity increment $\Delta\vec{V}eq$. This determination is carried out on the basis of velocity measurements made in the moving trihedron, as mentioned in the process in accordance with the invention as presented earlier and as described in further detail below on the basis of illustrative examples.

By way of example, for a perturbing motion corresponding to a sculling motion consisting of conical motion and a sinusoidal acceleration, the implementation of the process in accordance with the invention preferably utilizes a general form of $\Delta\vec{VF}$ defined by the relation:

$$\Delta\vec{VF} = B(t)\left[\sum_{n=1}^{n=p}\Delta\vec{Vn} + \left(\sum_{n=1}^{n=p}an\Delta\vec{\Theta}n\right)\Lambda\left(\sum_{n=1}^{n=p}bn\Delta\vec{Vn}\right)\right]$$

in which n=1, 2, ..., p, and p is an integer greater than or equal to 2, $\Delta\vec{V}1$ to $\Delta\vec{V}p$ represent successive accelerometric measurements, $\Delta\vec{\theta}1$ to $\Delta\vec{\theta}p$ represent successive gyrometric measurements, and a1 to ap as well as b1 to bp represent coefficients to be determined.

Furthermore, in the first step B of the process in accordance with the invention, as error criterion, use is made of the mean value of the velocity $\Delta\vec{V}$mea, obtained from the velocity increment $\Delta\vec{VF}$ and calculated, for a periodic perturbing motion of angular frequency $\Omega$, over a period $2\pi/\Omega$ of said perturbing motion, through the relation:

$$\vec{\Delta Vmea} = \Omega/2\pi \int_0^{2\pi/\Omega} \vec{\Delta VF} dt$$

Next, in the second step C of the process in accordance with the invention, for the general form of $\Delta VF$ defined earlier, the coefficients a1 to ap and b1 to bp are determined by performing the following operations:

a truncated expansion of said mean value of the velocity $\vec{\Delta V}$mea is formed; and the coefficients a1 to ap and b1 to bp which make it possible to zero at least the first order in said truncated expansion are calculated.

By way of illustration, the steps described earlier of the process in accordance with the invention are made explicit below in two particular examples, said examples making it possible to obtain two particularly advantageous solutions.

In a first example, use is made of a particular theoretical form of $\vec{\Delta VF}$ defined by the relation:

$$\vec{\Delta VF} = B(h)[\vec{\Delta Vj} + (a1\vec{\Delta \theta i} + aj\vec{\Delta \theta j})\Lambda(bi\vec{\Delta Vi} + bj\vec{\Delta Vj})]$$

$\vec{\Delta \theta j}$ and $\vec{\Delta Vj}$ representing respectively two successive measurements of $\vec{\Delta \theta i}$ and $\vec{\Delta Vi}$ made at a time h after the measurements of $\vec{\Delta \theta i}$ and $\vec{\Delta Vi}$.

According to the invention, this theoretical form is optimized by searching for the values of ai, aj, bi and bj which limit the error under a sculling motion.

For this purpose, $\vec{\Delta V}$mea is first calculated through the relation:

$$\vec{\Delta Vmea} = \Omega/2\pi \int_0^{2\pi/\Omega} \vec{\Delta VF(t)} dt$$

Then, a truncated expansion of $\vec{\Delta V}$mea is carried out and yields the result:

$$\vec{\Delta Vmea} = \begin{bmatrix} 0 \\ \alpha[(1/12)k1\Omega^2 h^3 - (1/240)k2\Omega^4 h^5] \\ \beta[(1/4)k3\Omega h^2 - (1/48)k4\Omega^3 h^4] \end{bmatrix}$$

with
$$\begin{array}{l} k1 = -1 + 6aibj - 6ajbi \\ k2 = -1 + 30aibj - 30ajbi \\ k3 = 1 + 2aibi + 2aibj + 2ajbi + 2ajbj \\ k4 = 1 + 2aibi + 14aibj + 14ajbi + 2ajbj \end{array}$$

and $\alpha$ and $\beta$ two constants.

It is found that it is impossible to zero the four coefficients k1 to k4 simultaneously.

The zeroing of the coefficients makes it possible to obtain a mathematic system of three equations (formed from the coefficients k1, k3, k4 for example) with four unknowns (ai, aj, hi, bj). There is therefore an infinity of solutions which is obtained by fixing the value of one of said unknowns.

For example, by fixing ai we obtain:

$$\begin{bmatrix} ai = ai & bi = -1/(12 \cdot 1ai) \\ aj = 1ai & bj = 1/(12ai) \end{bmatrix}$$

with 1 a solution of the equation:

$$1^2 + 61 - 1 = 0$$

which admits of two real solutions:

$$1 = -3 + \sqrt{10} \text{ and } 1 = -3 - \sqrt{10}$$

This solution is particularly advantageous since:

on the one hand, it requires for its implementation only two successive measurements of the gyrometric and accelerometric data, namely $\vec{\Delta \theta i}$, $\vec{\Delta \theta j}$, $\vec{\Delta Vi}$ and $\vec{\Delta Vj}$; and on the other hand, the accuracy obtained by this correction is satisfactory.

In a second example, use is made of the general form of $\vec{\Delta VF}$ defined earlier, with p=3, so as to obtain a velocity increment $\vec{\Delta VF}$ of the form:

$$\vec{\Delta VF} = B(h)[\vec{\Delta V1} + \vec{\Delta V2} + \vec{\Delta V3} + (a1\vec{\Delta \theta 1} + a2\vec{\Delta \theta 2} + a3\vec{\Delta \theta 3})\Lambda(b1\vec{\Delta V1} + b2\vec{\Delta V2} + b3\vec{\Delta V3})]$$

$\vec{\Delta V1}$ and $\vec{\Delta \theta 1}$, $\vec{\Delta V2}$ and $\vec{\Delta \theta 2}$, $\vec{\Delta V3}$ and $\vec{\Delta \theta 3}$ corresponding in this case to measurements made at instants t1+h/3, t1+(2h)/3, t1+h, t1 being any instant.

By calculating:

$$\vec{\Delta Vmea} = \Omega/2\pi \int_0^{2\pi/\Omega} \vec{\Delta VF(t)} dt$$

and by carrying out a truncated expansion of $\Delta V$mea, the first order of which is zeroed, in a manner identical to the first example presented earlier, a mathematical system of five equations with six unknowns is obtained.

Said mathematical system makes it possible to obtain, by fixing for example a3, the following results:

$$\begin{cases} a1 = ka3 & b1 = -\frac{19}{20} \cdot \frac{1}{a3} \\ a2 = \frac{k(47k+7)}{19k^2 - 1} a3 & b2 = -\frac{1}{20} \cdot \frac{133k + 47}{(19k^2 - 1)} \cdot \frac{1}{a3} \\ a3 = a3 & b3 = -\frac{1}{20k} \cdot \frac{1}{a3} \end{cases}$$

with k a solution of the equation:

$$6859k^6 - 10830k^5 - 6612k^4 - 2000k^3 - 348k^2 - 30k + 1 = 0$$

which admits of two real solutions:
k≈0.024972137 and k≈2.1076122.

In addition to allowing extremely accurate retrieval of the velocity, this latter solution requires fewer calculations for its implementation than for example the aforesaid known solution.

Furthermore, said solution is particularly well suited to joint use with the Miller algorithm cited earlier and generally used to carry out the calculations for transforming between the moving trihedron Tm and the fixed trihedron Tf.

The present invention also relates to a correction device 16 intended to replace the device 8 of FIG. 2 and making it possible in particular to implement the results obtained in the aforesaid two examples.

According to the invention, said correction device 16 represented diagrammatically in FIG. 4 includes:

a first peripheral computer 17 capable of carrying out vector multiplications, in particular of the type $an.\Delta\vec{\theta}n$ and $bn.\Delta\vec{V}n$;

a second peripheral computer 18 capable of carrying out vector products, in particular of the type:

$$\left(\sum_{n=1}^{n=p} an\Delta\vec{\theta}n\right) \wedge \left(\sum_{n=1}^{n=p} bn\Delta\vec{V}n\right); \text{ and}$$

a central computer 19 connected on the one hand, via double links 20 and 21 respectively to said first and second peripheral computers 17 and 18 and, on the other hand, via the links 9 and 10 respectively to the assembly 2 of accelerometers and to the assembly 1 of gyrometers, said central computer 19 coordinating the various calculations and transmitting to its output via the link 11 the value of $\Delta\vec{V}eq$ calculated through implementation of the results obtained by the process, described earlier, in accordance with the invention.

I claim:

1. A process for minimizing, in a strapdown inertial measurement system, an error due to a perturbing motion in retrieval of a velocity, said velocity being retrieved by implementing a velocity retrieval process using measured accelerometric and gyrometric data combined with specific coefficients, said process comprising:

(a) defining an error criterion which indicates the error due to said perturbing motion in the retrieval of the velocity and which is determined from said specific coefficients;

(b) calculating, in accordance with the error criterion defined in step (a), values of said specific coefficients which enable said error criterion to be minimized; and (c) integrating said values of the coefficients calculated in step (b) into said velocity retrieval process.

2. The process as claimed in claim 1, wherein, in order to determine velocity VF in a fixed inertial trihedron of the system, the implementation of the velocity retrieval process utilizes a velocity increment $\Delta\vec{V}F$ exhibiting a general theoretical form defined by the relation $\Delta\vec{V}F=B(t)\Delta\vec{V}eq$, in which $\Delta\vec{V}eq$ represents a velocity increment formed from said accelerometric data measured in an accelerometric trihedron moving with respect to said system, from said gyrometric data and from said specific coefficients, and B(t) is an attitude matrix depending on the time t and making it possible to transfer from the accelerometric trihedron to the inertial trihedron.

3. The process as claimed in claim 2, wherein the general theoretical form of $\Delta\vec{V}F$ is defined by the relation:

$$\Delta\vec{V}F = B(t)\left[\sum_{n=1}^{n=p}\Delta\vec{V}n + \left(\sum_{n=1}^{n=p} an\Delta\vec{\theta}n\right) \wedge \left(\sum_{n=1}^{n=p} bn\Delta\vec{V}n\right)\right]$$

in which n=1, 2, ..., p, and p is an integer greater than or equal to 2, $\Delta\vec{V}1$ to $\Delta\vec{V}p$ represent successive accelerometric measurements, $\Delta\vec{\theta}1$ to $\Delta\vec{\theta}p$ represent successive gyrometric measurements, and a1 to ap as well as b1 to bp represent coefficients to be determined.

4. The process as claimed in claim 3, wherein, to determine the coefficients a1 to ap and b1 to bp:

a truncated expansion of said mean value of the velocity $\Delta\vec{V}$mea is carried out; and the coefficients a1 to ap and b1 to bp which make it possible to zero at least the first order in said truncated expansion are calculated.

5. The process as claimed in claim 3, wherein, for a perturbing motion corresponding to a sculling motion consisting of a conical motion and a sinusoidal acceleration along the axis of the conical motion, a general theoretical form of $\Delta\vec{V}F$ is used for which p=2, making it possible to obtain a velocity increment defined by the relation:

$$\Delta\vec{V}F=B(t)[\Delta\vec{V}j+(ai\Delta\vec{\theta}i+aj\Delta\vec{\theta}j)\wedge(bi\Delta\vec{V}i+bj\Delta\vec{V}j)]$$

in which, for any value of ai, the coefficients aj, bi and bj satisfy:

$$\begin{cases} aj = 1ai \\ bi = -1/(12\,1ai) \\ bj = 1/(12\,ai) \end{cases}$$

with 1 a solution of the equation $1^2+61-1=0$, $\Delta\vec{V}i$ and $\Delta\vec{V}j$ being two successive accelerometric measurements and $\Delta\vec{\theta}i$ and $\Delta\vec{\theta}j$ being two successive gyrometric measurements.

6. The process as claimed in claim 3, wherein, for a perturbing motion corresponding to a sculling motion consisting of a conical motion and a sinusoidal acceleration along the axis of the conical motion, a general theoretical form of $\Delta\vec{V}F$ is used for which p=3, making it possible to obtain a velocity increment defined by the relation:

$$\Delta\vec{V}F=B(t)[\Delta\vec{V}1+\Delta\vec{V}2+\Delta\vec{V}3+(a1\Delta\vec{\theta}1+a2\Delta\vec{\theta}2+a3\Delta\vec{\theta}3)\wedge(b1\Delta\vec{V}1+b2\Delta\vec{V}2+b3\Delta\vec{V}3)]$$

in which, for any value of a3, the coefficients a1, a2, b1, b2 and b3 satisfy:

$$\begin{cases} a1 = ka3 & b1 = -\frac{19}{20}\cdot\frac{1}{a3} \\ a2 = \frac{k(47k+7)}{19k^2-1}a3 & b2 = -\frac{1}{20}\cdot\frac{133k+47}{(19k^2-1)}\cdot\frac{1}{a3} \\ & b3 = -\frac{1}{20k}\cdot\frac{1}{a3} \end{cases}$$

with k a solution of the equation:

$$6859k^6-10830k^5-6612k^4-2000k^3-348k^2-30k+1=0.$$

7. The process as claimed in claim 3, wherein, as error criterion, the mean value of the velocity $\Delta\vec{V}$mea obtained from the velocity increment $\Delta$VF is calculated.

8. The process as claimed in claim 2, wherein, as error criterion, the mean value of the velocity $\Delta\vec{V}$mea obtained from the velocity increment $\Delta$VF is calculated.

9. A strapdown inertial measurement system comprising:
   an assembly of accelerometers for measuring accelerometric data;
   an assembly of gyrometers for measuring gyrometric data; and
   a device for minimizing an error due to a perturbing motion in retrieval of a velocity, said device comprising:

a first peripheral computer for carrying out vector multiplications based on the accelerometric data and the gyrometric data;

a second peripheral computer for carrying out vector products based on the accelerometric data and the gyrometric data; and a central computer connected to said first and second peripheral computers for coordinating the vector multiplications and vector products carried out by the first and second peripheral computers to (i) define an error criterion which indicates the error due to the perturbing motion in the retrieval of the velocity and which is determined from specific coefficients, (ii) calculate, in accordance with the error criterion defined in operation (i), values of the specific coefficients which enable the error criterion to be minimized and (iii) integrating the values of the specific coefficients calculated in operation (ii) into the retrieval of the velocity.

* * * * *